United States Patent [19]

Mezrich

[11] 4,138,895
[45] Feb. 13, 1979

[54] SWITCHABLE DEPTH OF FOCUS PULSE-ECHO ULTRASONIC-IMAGING DISPLAY SYSTEM

[75] Inventor: Reuben S. Mezrich, Rocky Hill, N.J.

[73] Assignee: RCA Corporation, New York, N.Y.

[21] Appl. No.: 844,140

[22] Filed: Oct. 20, 1977

[51] Int. Cl.² ............................................. G01N 9/24
[52] U.S. Cl. ...................................... 73/626; 73/641; 73/642
[58] Field of Search ................ 73/603, 606, 607, 620, 73/625, 626, 627, 641, 642; 340/5 MP, 5 H, 9, 15; 128/2 V, 2.05 Z

[56] References Cited
U.S. PATENT DOCUMENTS 3,937,066  2/1976  Green et al. .......................... 73/607
4,012,952  3/1977  Dory .................................. 73/626 X
4,016,750  4/1977  Green ................................. 73/629

Primary Examiner—S. Clement Swisher
Assistant Examiner—John P. Beauchamp
Attorney, Agent, or Firm—H. Christoffersen; Samuel Cohen; George J. Seligsohn

[57] ABSTRACT

An ultrasonic transducing unit comprising a central section, which cooperates with only a small portion of the relatively large aperture of an acoustic lens, and an annular section, which cooperates with the remainder of the aperture, can be selectively operated by switch means to utilize the relatively large depth of focus detected signal of the central section alone or to utilize the relatively small depth of focus detected signal of both the central and annular sections together.

6 Claims, 6 Drawing Figures

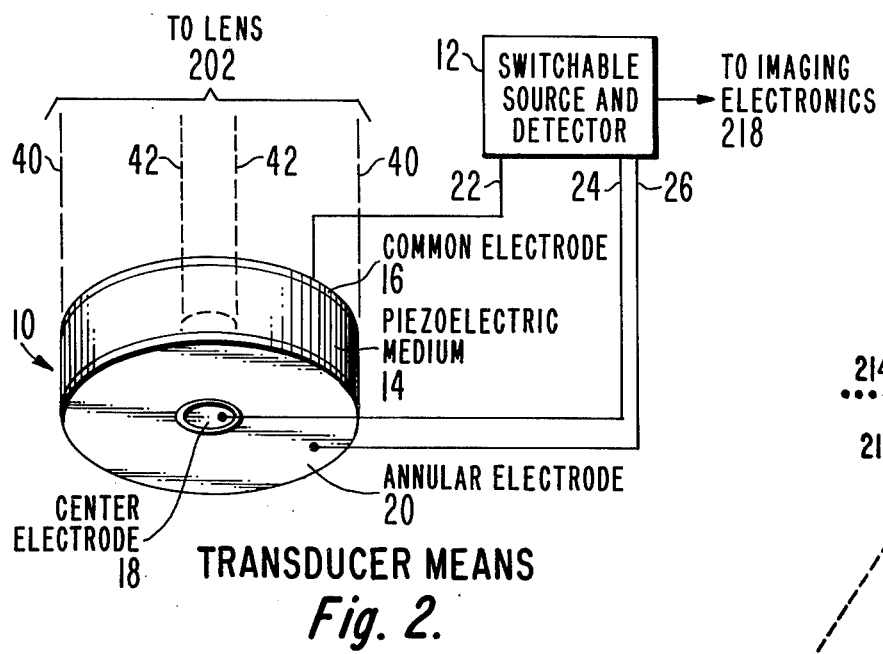
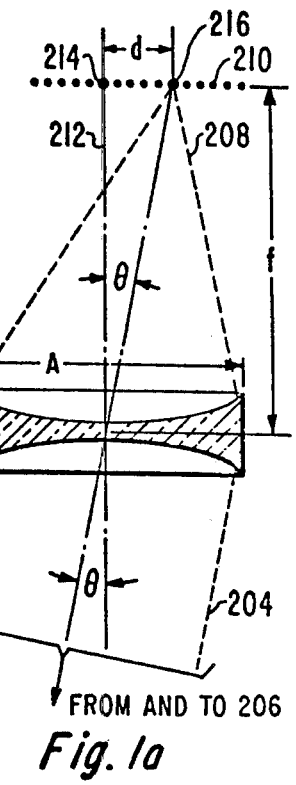
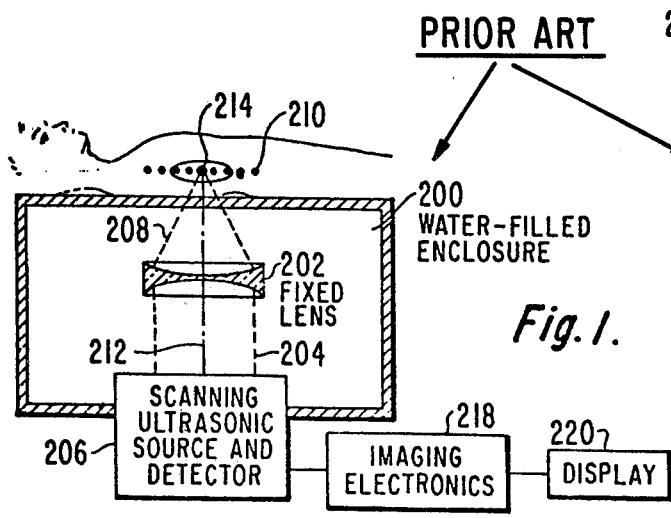
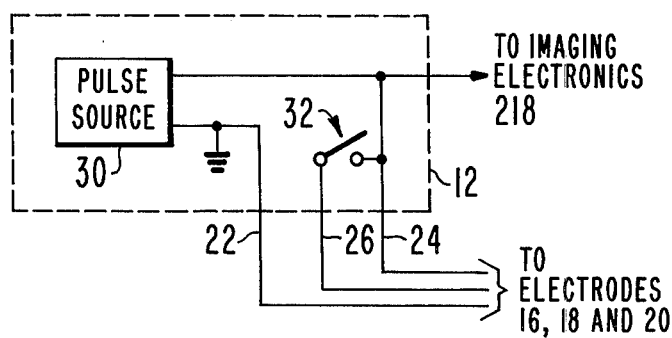

SWITCHABLE DEPTH OF FOCUS PULSE-ECHO ULTRASONIC-IMAGING DISPLAY SYSTEM

Reference is made to my copending U.S. patent application, Ser. No. 766,527, filed Feb. 7, 1977, and to U.S. patent application Ser. No. (844,141), filed on even date herewith by D. H. Vilkomerson. Both of these copending applications are assigned to the same assignee as the present invention.

My aforesaid application Ser. No. 766,527 discloses a high resolution pulse-echo ultrasonic imaging display system of a type which employs a relatively large aperture fixed lens for displaying a representation of internal structure of an opaque object, such as the soft tissue within the body of a living human being. This sytem comprises ultrasonic beam forming means that include transducer means generating successive pulses of ultrasonic wave energy and beam scanning means for illuminating certain internal structure through a focusing lens with a scanning focused beam of pulse ultrasonic wave energy. The transducer means is situated remotely from both the focusing lens and from the internal structure and is used to receive and detect a signal portion of the focused beam reflected from certain internal structure and returned to the transducer means after a time delay proportional to the distance between the remotely situated transducer means and internal structure. In accordance with the teaching of the aforesaid patent application Ser. No. 766,527, the depth of focus field for the scanning focused beam can be made several times the focused spot size of the scanning focused beam. This permits structure having an appreciable depth dimension, but a depth dimension which is still no greater than the depth of focus field, to be displayed as a B-scan or as three-dimensional representation with high resolution.

The present invention is directed to an improvement in the aforesaid pulse-echo ultrasonic-imaging display system, in which the lens either may be fixed or movable. In accordance with this improvement, the transducer means includes a central section surrounded by a separate annular section. The central section is effective in detecting only a first part of the signal portion which first part has returned through only a small portion of the given aperture of the focusing lens. The annular section is effective in detecting a second part of the signal portion which second part is returned through the remainder of the given aperture of the focusing lens. The transducer means further includes switch means coupled to the central and annular sections for selectively using the first part of the detected signal portion alone or utilizing together both the first and second parts of the detected signal portion. The aforesaid Vilkomerson application is directed to a particular species of this improvement.

IN THE DRAWING

FIGS. 1 and 1a (which are identical to FIGS. 1 and 1a of my aforesaid application Ser. No. 766,527) illustrate the type of pulse-echo ultrasonic imaging system that may embody the present invention;

FIG. 2 illustrates transducer means embodying the present invention which may be incorporated in the scanning ultrasonic source and detector of FIG. 1;

FIG. 3 illustrates a first species of the switchable source and detector of FIG. 2;

Figure 4:
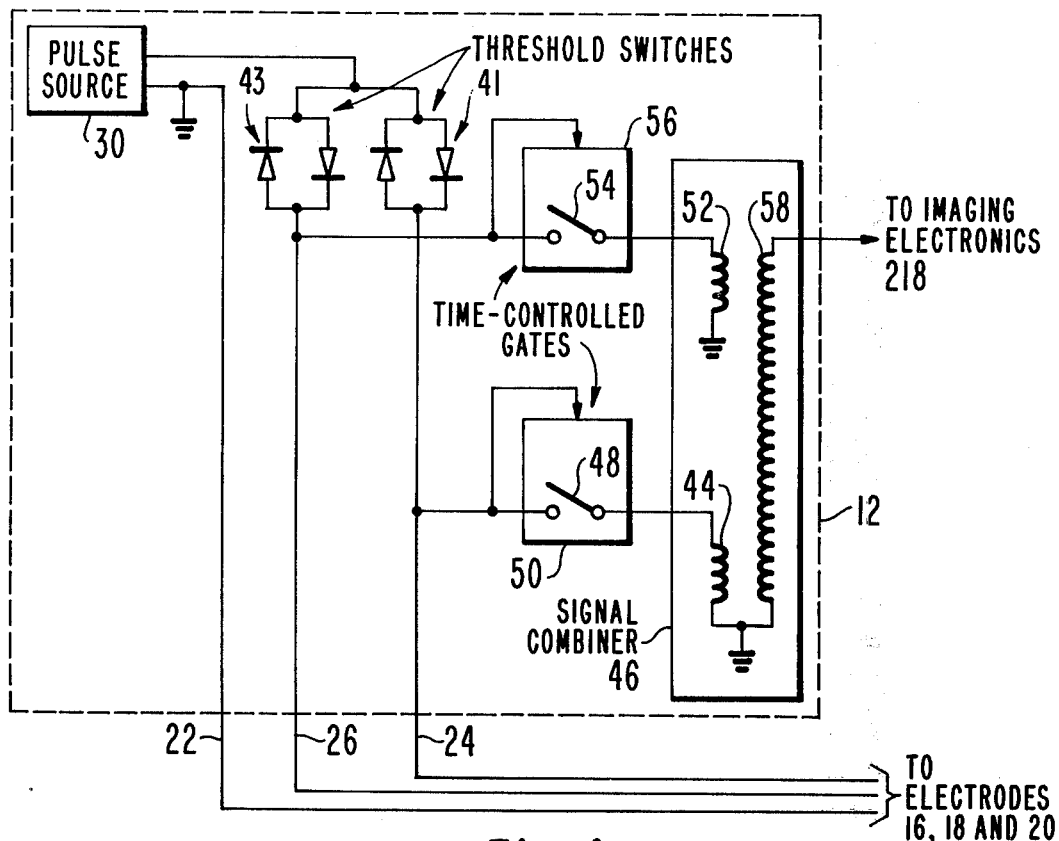
FIG. 4 illustrates a second species of the switchable source and detector of FIG. 2.

Referring to FIGS. 1 and 1a, there is shown a human patient lying on water-filled table 200. Immersed within water-filled table 200 is fixed lens 202, which is illuminated by a substantially plane wavefront beam 204 of ultrasonic energy from scanning ultrasonic source and detector 206 disposed in spaced relationship with fixed lens 202.

The term "fixed" lens, as used herein, means that the effective position of the aperture of lens 202 remains substantially stationary with respect to the human patient lying on water-filled table 200 during an image scan. However, in order to select the particular soft tissue within the human patient to be imaged, the operating distance between lens 202 and the human patient may be adjusted, if desired, prior to an image scan, by either changing the height of the top of water-filled table 200 with respect to lens 202 or by changing the position of lens 202 with respect to the top of the water-filled table 200 without departing from the above definition of "fixed" lens. Further, since the mere rotation of a circularly symmetrical lens about its own axis has no effect at all on the position of lens aperture or the way the lens acts on ultrasonic energy transferred therethrough, such mere rotation of the lens about its own axis is to be construed as to be within the above definition of the term "fixed" lens. Fixed lens 202 transfers the ultrasonic energy in plane wavefront beam 204 incident thereon into converging beam 208, which focuses at a small spot of focal plane 210 of lens 202 (located within the body of the human patient).

While the present invention described below is for use in a system employing a "fixed" lens, it also may be used in prior art systems employing a "movable" acoustic lens.

FIG. 1 shows plane-wavefront illuminating beam 204 of ultrasonic energy at a point in its scan where its direction of travel is parallel to acoustic axis 212 of fixed lens 202. In this case, ultrasonic energy converging beam 208 emerging from fixed lens 202 focuses at a spot centered at a focal point 214 in focal plane 210 of lens 202. However, as shown in FIG. 1a, when plane wavefront illuminating beam 204 is at a point in its scan where its direction of travel is angularly displaced by angle $\theta$ from acoustic axis 212 of lens 202, converging beam 208 emerging from lens 202 focuses at a spot centered at point 216 in focal plane 210 of lens 202. As shown in FIG. 1a, point 216 is linearly displaced by a distance $d$ from focal point 214. As is known in the optical art, the relationship between the distance $d$ and the angular displacement $\theta$ is given by the following equation:

$$d = f\theta, \qquad (1)$$

where $f$ is the focal distance of lens 202, as shown in FIG. 1a, and the maximum value of $\theta$ is sufficiently small (as is the case) to be substantially equal in radians to $\tan \theta$.

It will be noted from equation 1 that the value of $d$ varies linearly with $\theta$. Further, as the value $\theta$ varies during a scan, the position of the point, such as point 216, to which beam 208 converges remains in focal plane 210. This ensures a substantially flat-field image (neglecting the effect of any lens abberations).

Scanning ultrasonic source and detector 206 includes therein, at the very least, (1) transducer means and driving electronics therefor for deriving exploratory pulses of ultrasonic frequency at a suitable repetition rate, as is known in the art, which exploratory pulses are projected from scanning ultrasonic source and detector as illuminating beam 204; (2) means for controlling, selecting and/or varying the angular orientation with which illuminating beam 204 is projected to thereby control, select and/or vary the angle θ with which illuminating beam 204 is incident on fixed lens 202, and (3) a detector coupled to or forming part of the transducer for receiving echoes of the exploratory pulses that have been "captured" by fixed lens 202 and received by the transducer of scanning ultrasonic source detector 206. In addition to these essential elements of scanning ultrasonic source and detector 206, block 206 may further include, when required or desired, such means as a collimating lens, a beam expander, a multi-element transducer with suitable controls for selecting a single or a subgroup of elements, an iris (which may be located in the vicinity of fixed lens 202) for adjusting the effective aperture of fixed lens 202 or any other means which may enhance the functional capability of scanning ultrasonic source and detector 206.

In any case, as is conventional, scanning ultrasonic source detector 206 derives an output signal manifesting detected echoes as a function of time along with suitable scan sync signals which are applied as an input to imaging electronics 218. Imaging electronics, which may be conventional, can include such means as range gates, scan converters, display deflection circuits synchronized with the scanning of illuminating beam 204, etc., to produce at the output thereof signals manifesting the relative intensity at each point of the image and one or more spatial coordinates of this point. As is conventional, this information is applied as the input to display 220, which may be a CRT display. In response thereto, the display derives a visual image of the "scene" within a region of the human patient scanned by converging ultrasonic beam 208.

The smallest detail of the visual image of the "scene" which can be resolved is even smaller than the size of the focused spot in the focal plane 210 because fixed lens 202 also operates on the reflected echo returned to scanning ultrasonic source and detector 208, in addition to operating on the original illuminating beam therefrom. In quantitative terms, the diameter Δ of the focused spot and the smallest resolvable detail Δ' in the image respectively, are given by the following equations:

$$\Delta = 2.44 \frac{f \cdot \lambda}{A} \text{ and,} \quad (2)$$

$$\Delta' = 1.46 \frac{f \cdot \lambda}{A}, \quad (3)$$

where λ is the wavelength of the propagating ultrasonic wave energy, and f and A are respectively the focal length and the aperture of fixed lens 202, shown in FIG. 2a.

Practical values for the aperture A and the focal length f of fixed lens 202, by way of example, are 5 inches and 10 inches respectively. If for example, the frequency of the ultrasonic energy is 3 MHz, the value of the propagation wavelength is substantially 0.5mm. Substitution of these example values, in equation 3, indicates that a resolvable image spot diameter Δ' of 1.46mm is obtained. By employing a fixed lens 202 having a larger value numerical aperture (i.e., a larger ratio of [A/f]) and/or employing ultrasonic energy at a frequency higher than 3 MHz, the image resolution capability can be increased even further. In general, depending upon the specific type of tissue being imaged and the depth of the tissue, optimum resolution in the range of 0.5–2.5mm may be accomodated by a suitable choice of values for the parameters λ, f and A of equations 2 and 3.

As is known in optics, the depth of field δ is given by the following equation:

$$\delta = 4\lambda \left(\frac{f}{A}\right)^2 \quad (4)$$

It can be seen from equation 4 that the depth of field δ varies inversely with the square of the value of the numerical aperture. In optics, this relationship cannot be practically exploited because the very small wavelength of light (i.e., 0.47–0.7μm) causes the depth of field for a high numerical aperture lens to become very small. However, in ultrasonics, where the value of the propagating wavelength λ is in the range of 0.15–1.5mm. (for frequencies of 1–10 MHz), a relatively large depth of field is retained even for a relatively large numerical aperture lens. For instance, in the practical example discussed above, where lens 202 has a focal length f of 10 inches and an aperture A of 5 inches, and the propagating wavelength λ is 0.5mm, equation 4 shows that the depth of field δ still has a relatively large value of 8mm (a value more than five times the image spot diameter of 1.46mm). Further, as can be seen by comparing equation 4 with equations 2 and 3, the depth of field varies inversely with the square of the numerical aperture, while the spot diameter varies inversely only linearly with the numerical aperture. Thus, if desired, the depth of field can be increased significantly, with only a relatively small price in resolution capability, by relatively small reduction in the value of the numerical aperture of lens 202.

In fact, by using such means as an iris to stop down the effective aperture of a large aperture lens, a large depth field, relatively low resolution preliminary image may be obtained for the purpose of ascertaining the exact location of a desired target area, so that a fine adjustment may then be made in the relative position of lens 202 with respect to the patient to ensure that the desired target area substantially coincides with the focal plane of lens 202. After this fine adjustment has been made, the iris may be opened fully to permit a high resolution image of the target area to be obtained.

The present invention provides a novel transducer means, within scanning ultrasonic source and detector 206, for performing functions similar to that of the iris, described above. Specifically, as shown in FIG. 2, the transducer means comprises transducing unit 10 coupled to switchable source and detector 12. More specifically, transducing unit 10 comprises a cylindrical slab of piezoelectric medium 14, common electrode 16, central electrode 18 and annular electrode 20. As shown, common electrode 16 covers the front face of piezoelectrice medium 14, central electrode 18 covers the center section of the rear face of piezoelectric medium 14 and annular electrode 20 is disposed on the rear face of piezoelectric medium 14 in surrounding, but non-touching, relationship with center electrode 18. Typically, the outer diameter of annular electrode 20 and the diameters of piezoelectric medium 14 are normally in a range from about 2.5 inches to somewhat more then 5 inches.

The diameter of center electrode 18 is much smaller, typically having a diameter within the range of between about ¼ to 2-inches.

Repsective conductors 22, 24 and 26 connect respective electrodes 16, 18 and 20 to switchable source and detector 12. The output from switchable source and detector 12 constitutes the output of block 206 of FIG. 1 applied to imaging electronics 218.

A first species of switchable source and detector 12 is shown in FIG. 3. As shown, switchable source and detector 12, in FIG. 3, comprises pulse source 30, which generates a series of voltage pulses each of which comprises electrical energy at the operating frequency of the desired ultrasonic wave energy. Each voltage pulse from pulse source 30 is applied across center electrode 18 and common electrode 16 of transducing unit 10 through respective conductors 24 and 22. In addition, center electrode 18 is coupled directly to the output of imaging electronics 218 through conductor 24.

This first species of switchable source and detector 12 shown in FIG. 3 also includes switch 32 having first (open) and second (closed) switch positions. In its first (open) switch position, annular electrode 20 is maintained disconnected from both pulse source 30 and imaging electronics 218. However, in its second (closed) switch position, switch 32 connects annular electrode 20 in parallel with center electrode 18 through conductors 26 and 24. Therefore, in the second switch position of switch 32, annular electrode 20 is connected to both pulse source 30 and to imaging electronics 218.

The operation of the transducer means of FIG. 2 will now be described, assuming that switchable source and detector 12 takes the form of its first species shown in FIG. 3. When switch 32 is its second (closed) switch position, so that voltage pulses are applied to both center electrode 18 and annular electrode 20, the entire transducer unit 10 is effective in generating a relatively wide beam of ultrasonic wave energy, delineated by the two lines 40—40. Wide beam 40—40, after being scanned by scanning means (not shown) illuminates substantially the entire aperture of lens 202. Lens 202 has a relatively large aperture, typically four or five inches, and has a relatively short focal length, typically ten inches, compared to its aperture. A typical value of ultrasonic wavelength is about 1mm (i.e., about 1/25 inch). Therefore, in accordance with equations (2) and (3) set forth above, high resolution is obtained. However, in accordance with equation 4, set forth above, the depth of focus field is relatively small, typically an inch or less. This is fine for a C-scan, in which the imaged structure has very little depth dimension but whose cross-sectional dimensions are scanned in both the X and Y directions. However, in the case of a B-scan, in which the depth of the imaged structure is scanned in a single one of the cross-sectional dimensions, it is necessary to have a relatively large depth of focus field.

A relatively large depth of focus field is obtained by operating switch 32 to its first (open) switch position, in which annular electrode 20 is disconnected. In this latter case, only the central region of the transducing unit 10, defined by center electrode 18, is effective in generating a relatively narrow beam of ultrasonic wave energy, delineated by lines 42—42.

This narrow beam of ultrasonic wave energy is incident only on a small portion of the total aperture of lens 202 occupying a varying region of the lens as the beam scans the aperture of the lens. Use of such a narrow ultrasonic beam 42—42 serves the same purpose as an iris, described above, in reducing the effective aperture of lens 202.

Since the depth of focus field, defined in equation 4, varies as the square of the ratio of the focal length to the effective aperture, a large increase in the depth of focused field is readily obtainable. Thus, for example, the depth of focus field of a lens having a total aperture of 4 inches may be increased by a factor of 16 simply by utilizing solely a center electrode 18 having a diameter of one inch. In this case, the resolution is reduced, but only by a factor of four.

As discussed above, sometimes it is desired to obtain a relatively low resolution preliminary B-scan image merely for the purpose of ascertaining the exact location of a desired target area, so that a fine adjustment may then be made in the relative position of lens 202 with respect to the patient to ensure that the desired target area substantially coincides with the focal plane of lens 202 during a later high resolution C-scan. In this preliminary image, only large "landmarks" in the body need be observed. Since resolution is not critical in this case, the diameter of center electrode 18 sometimes may be reduced to as little as one-quarter. This provides an increase in depth of focus, with respect to a lens having a total lens aperture of 4 inches, by a factor of 256, with the resolution being reduced by only a factor of 16.

FIG. 4 illustrates a second species of switchable source and detector 12 which provides a time-varying effective aperture, useful in making a B-scan of certain relatively deep structure. Specifically, that fraction of the depth of the structure under examination which is within the relatively small focal region of the relatively large total lens aperture is detected by means of both center electrode 18 and annular electrode 20. This provides maximum available resolution within this small focal region. The remaining fraction of the structure under examination (which is outside of the relatively small focal region of the total lens aperture) is detected solely by center electrode 18, without the use of annular electrode 20.

In the second species of switchable source and detector 12, shown in FIG. 4, pulse source 30 applies each voltage pulse both across center electrode 18 and common electrode 16, through threshold switch 41 and conductors 24 and 22, and across annular electrode 20 and common electrode 16, through threshold switch 43 and conductors 26 and 22. As shown, each of the threshold switches 41 and 43 comprises a pair of oppositely poled semiconductor diodes. Each threshold switch conducts for both positive and negative polarities, so long as the absolute value of the amplitude exceeds a given threshold (i.e., 0.7 volt for most semiconductor diodes). As shown, conductor 22 from common electrode 16 is grounded.

Conductor 24, from center electrode 18, is also connected to one end of first primary winding 44 of signal combiner 46 through normally open switch 48 of time-controlled gate 50. The other end of first primary winding 44 is grounded. In addition, conductor 24 is connected to the control input of gate 50. In a similar manner, conductor 26, from annular electrode 20, is connected to one end of second primary winding 52 of signal combiner 46 through normally open switch 54 of time-controlled gate 56. The other end of second primary winding 52 is grounded. Conductor 26 is also connected to the control input of gate 56. The structure of time-controlled gates 50 and 56 is substantially similar to that of conventional range gates employed both in sonar and radar. One end of secondary winding 58 of signal combiner 46 is coupled, as the output of the second species of switchable source and detector 12, to imaging electronics 218. The other end of secondary winding 58 is grounded.

Reference is made to the timing diagram of FIG. 5 in the following discussion of the operation of the second species of switchable source and detector 12, shown in FIG. 4. For illustrative purposes, in this discussion, it is assumed that the wavelength of the ultrasonic energy is 1mm (about 1/25 inch), that the lens 202 has an aperture of 4 inches and focal length of 10 inches, that center electrode 18 is substantially one inch in diameter and that annular electrode 20 has an outer diameter of at least 4 inches.

Figure 5:
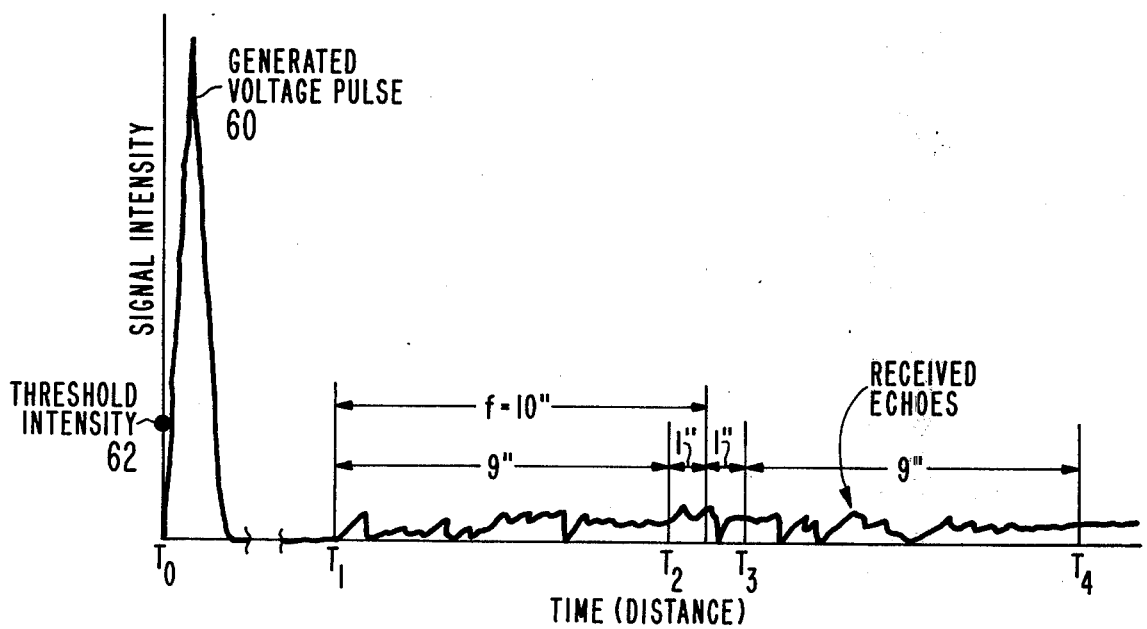
FIG. 5 is a plot of signal intensity as a function of time, which is useful in explaining the operation of the second species of the invention of FIG. 4.

Referring to both FIGS. 4 and 5, pulse source 30 initiates the generation of a typical voltage pulse 60 at time $T_0$. Voltage pulse 60 has an amplitude much greater than the value of threshold intensity 62 of threshold switches 40 and 42. Therefore, a voltage pulse is applied both across center electrode 18 and common electrode 16 and across annular electrode 20 and common electrode 16. This results in the generation of a wide ultrasonic beam 40—40, (FIG. 2) which is transmitted toward the structure being imaged.

Voltage pulse 50 is also applied as a control input to time-controlled gates 50 and 56. In response thereto, time-controlled gate 50, after a suitable time delay, closes switch 48 at time $T_1$. As shown in FIG. 5, time $T_1$ occurs just about when echoes from lens 202 itself, i.e., from a plane 10 inches (the focal distance $f$ of lens 202), in front of the focal plane of lens 202, are received by transducing unit 10. Time-controlled gate 56 closes switch 54 after a longer time delay at time $T_2$. As shown in FIG. 5, $T_2$ occurs when echoes from a plane 1 inch in front of the focal plane of lens 202 are being received. Time-controlled gate 56 maintains switch 54 closed until time $T_3$. As shown in FIG. 5, this occurs when echoes from a plane 1 inch beyond the focal plane of lens 202 are being received. Time-controlled gate 50 maintains switch 48 closed until time $T_4$ (or even later if desired). As shown in FIG. 5, at time $T_4$ echoes from a plane 10 inches beyond the focal plane of lens 202 are received.

As indicated in FIG. 5, all echoes have an amplitude substantially below the value of the threshold intensity 62 of the switches 41 and 43. Thus, pulse source 30 is isolated from the received echoes. However, center electrode 18 is effective in detecting those received echoes within narrow beam 42—42. Only those echoes detected by center electrode 18 which occur in the time interval between time $T_1$ and time $T_4$ are forwarded to signal combiner 46 through closed switch 48 to constitute a first part of the detected signal portion.

The remainder of the received echoes, which are within wide beam 40—40 but are outside of narrow beam 42—42, are detected by annular electrode 20. However, only those received echoes detected by annular electrode 20 which occur in the time interval between $T_2$ and $T_3$ are forwarded to signal combiner 46 through closed switch 54 to constitute a second part of the detected signal portion. The first and second parts of the detected signal portion are combined by signal combiner 46 and the resultant signal is applied to imaging electronics 218.

Based on the assumed values set forth above, the depth of focus field for the total 4 inch aperture lens is $\pm$ 1 inch from the focal plane. This is an identical region to that corresponding to the time interval between times $T_2$ and $T_3$ when both the first and second parts of the signal portion are being forwarded to signal combiner 46. In this focal region a resolution of about 3mm is obtained.

Further, with the assumed values, equation 4 shows that center electrode 18 alone has a depth of focus field of $\pm$ 16 inches. Thus, during the time interval between times $T_1$ and $T_2$ and during the time interval between times $T_3$ and $T_4$ the effective aperture provides this $\pm$ 16 inches depth of focus field. Resolution within these latter time intervals is about 12mm.

Obviously more than one annular electrode may be employed, if desired, in order to provide finer control of the adjustment of the effective aperture. However, the greater complexity of using more annular electrodes must be balanced off against the improved resolution capability achieved.

For medical diagnostic purposes, the particular advantage of the present invention is that it allows lowered resolution B-scan over the whole depth of the body so as to allow the physician to locate "landmarks" in the body and yet provides a fine-resolution focused volume around the region of the body of most interest. The full aperture is not really needed to obtain the "landmarks".

This is particularly true of the overlying tissue which results in less attenuation of the reflected ultrasonic energy. Therefore, the full sensitivity of the total aperture is not required to provide strong detected signals from such overlying tissue by the central region, defined by center electrode 18, alone of transducing unit 10.

Although in the system shown in FIG. 1, the focusing lens is "fixed" and is situated remotely from the transducer unit, this need not be the case. The present invention is also applicable to the case where the focusing lens is attached to and is movable with the transducer unit, as shown in U.S. Pat. No. 3,958,559, issued May 25, 1976 to Glenn, et al.

What is claimed is:

1. In apparatus for use in an ultrasonic pulse-echo system capable of displaying an image of certain internal structure of a visually opaque object being scanned with ultrasonic wave energy, said apparatus including an acoustic focusing lens occupying a given aperture, and ultrasonic beam forming means including transducer means generating successive pulses of ultrasonic wave energy and beam scanning means for illuminating said certain internal structure through said focusing lens with a scanning focused beam of said pulsed ultrasonic wave energy, said transducer means being situated remotely from said internal structure for receiving and detecting a signal portion of said focused beam reflected from said certain internal structure and returned through said focusing lens to said transducer means after a time delay proportional to the distance between said remotely situated transducer means and internal structure; the improvement:

wherein said transducer means includes a central section surrounded by a separate annular section, said central section being effective in detecting only a first part of said signal portion which first part has returned through only a predetermined size small portion of said given aperture of said focusing lens, said annular portion being effective in detecting a second part of said signal portion which second part has returned through the remainder of said given aperture of said focusing lens, and said transducer means further includes switch means coupled to said central and annular sections for selectively utilizing said first part of said detected signal portion alone or utilizing together both said first and second parts of said detected signal portion.

2. The apparatus defined in claim 1, wherein said transducer means includes a piezoelectric medium having a common electrode on one side thereof and a center electrode surrounded by an annular electrode on the other side thereof, said switch means being selectively coupled to said electrodes so that in a first switch position thereof only the signal between said center electrode and said common electrode constitutes said first part of said signal portion and so that in a second switch position thereof both the signal between said center electrode and said common electrode and the signal between said annular electrode and said common electrode constitute a resultant signal equal to both said first and second parts of said detected signal.

3. The apparatus defined in claim 2, wherein said switch means includes a switch connected between said center and annular electrodes for maintaining said center electrode disconnected from said annular electrode in said first switch position and for connecting said annular electrode directly to said center electrode in said second switch position, and a utilization output terminal connected solely to said center electrode.

4. The apparatus defined in claim 2, wherein the outer diameter of said annular electrode is at least 1.25 times the diameter of said center electrode.

5. The apparatus defined in claim 4, wherein the diameter of said center electrode has a diameter between 0.25 and 2 inches. 1

6. The apparatus defined in claim 5, wherein the outer diameter of said annular electrode is at least 2.5 inches.

* * * * *